US009027216B2

(12) United States Patent
Beeles et al.

(10) Patent No.: US 9,027,216 B2
(45) Date of Patent: May 12, 2015

(54) SWAGE COLLAR WITH INTERNAL SEALING INSERT

(75) Inventors: Edward E Beeles, Hermosa Beach, CA (US); David Hocking, Signal Hill, CA (US); Julie R. Jones, Bethalto, IL (US); Stuart R. Seley, Kirkwood, MO (US); John E. Inman, Frontenac, MO (US)

(73) Assignees: Hi-Shear Corporation, Torrance, CA (US); The Boeing Company, Chicago, IL (US)

( * ) Notice: Subject to any disclaimer, the term of this patent is extended or adjusted under 35 U.S.C. 154(b) by 136 days.

(21) Appl. No.: 13/225,528

(22) Filed: Sep. 5, 2011

(65) Prior Publication Data

US 2012/0240376 A1    Sep. 27, 2012

Related U.S. Application Data

(60) Continuation of application No. 12/551,738, filed on Sep. 1, 2009, now Pat. No. 8,011,076, which is a division of application No. 10/031,184, filed as application No. PCT/US01/19983 on Jun. 22, 2001, now Pat. No. 7,597,517.

(60) Provisional application No. 60/213,769, filed on Jun. 23, 2000.

(51) Int. Cl.
  *B25B 27/10*    (2006.01)
  *F16B 19/05*    (2006.01)
  (Continued)

(52) U.S. Cl.
  CPC ........... *F16B 19/05* (2013.01); *Y10T 29/49826* (2015.01); *Y10T 29/53996* (2015.01);
  (Continued)

(58) Field of Classification Search
  CPC ........ B23P 11/022; B23P 15/50; B23P 19/06; B25B 29/02
  USPC ................ 29/243.5, 243.529, 243.56, 243.53
  See application file for complete search history.

(56) References Cited

U.S. PATENT DOCUMENTS

| 3,066,568 | A | 12/1962 | Armour |
| 3,094,017 | A | 6/1963 | Siebol et al. |

(Continued)

FOREIGN PATENT DOCUMENTS

GB        2119467      11/1983

OTHER PUBLICATIONS

Schaeffler, C., WIPO International Search Report, PCT/US01/19983, Nov. 12, 2001, EPO, 3 pp.

*Primary Examiner* — Lee D Wilson
(74) *Attorney, Agent, or Firm* — Henricks, Slavin & Holmes LLP

(57) ABSTRACT

A swage collar and an internal sealing insert form a swage collar assembly used in combination with a structural fastener to prevent leakage through a connection of workpieces fastened together by the structural fastener. The swage collar has a hollow, generally cylindrical main body portion with a main central bore, and a base portion with an internal shoulder formed in the main central bore so as to form a seal receiving guide. The shaft of the fastener typically includes a threaded section and an unthreaded section, and the internal sealing insert interfaces with the threaded section and the unthreaded section of the shaft of the pin. In an alternate embodiment, the internal sealing insert interfaces with the unthreaded section of shaft of the pin. The swage collar assembly is fitted over the fastener, a swaging tool is fitted over the swage collar assembly, and the swaging tool is forced over the swage collar assembly with sufficient force to cause plastic deformation in the swaging collar to force the swaging collar and internal sealing insert into engagement with the shaft of the fastener.

16 Claims, 8 Drawing Sheets

(51) Int. Cl.
*F16B 37/00* (2006.01)
*F16B 39/02* (2006.01)

(52) U.S. Cl.
CPC ...... *Y10T29/53839* (2015.01); *Y10T 29/53765* (2015.01); *Y10T 29/53735* (2015.01); *F16B 37/005* (2013.01); *F16B 39/026* (2013.01)

(56) References Cited

U.S. PATENT DOCUMENTS

| | | |
|---|---|---|
| 3,139,786 A | 7/1964 | Ardell |
| 3,339,003 A | 8/1967 | Cessna |
| 3,399,589 A | 9/1968 | Breed |
| 3,425,259 A | 2/1969 | Baugh |
| 3,464,306 A * | 9/1969 | Orloff et al. ............... 411/361 |
| 3,464,472 A | 9/1969 | Reynolds |
| 3,550,498 A | 12/1970 | Briles |
| 3,622,167 A | 11/1971 | Velthoven |
| 3,635,272 A | 1/1972 | Scheffer |
| 3,695,086 A | 10/1972 | Savage |
| 3,742,808 A | 7/1973 | Trembley |
| 4,069,575 A | 1/1978 | Sigmund |
| 4,112,811 A | 9/1978 | King |
| 4,347,728 A | 9/1982 | Smith |
| 4,367,060 A | 1/1983 | Berecz |
| 4,768,910 A | 9/1988 | Rath |
| 4,813,834 A | 3/1989 | Smith |
| 4,867,625 A | 9/1989 | Dixon |
| 4,979,279 A | 12/1990 | Garvey |
| 5,090,852 A | 2/1992 | Dixon |
| 5,145,300 A | 9/1992 | Wallace |
| 5,208,958 A | 5/1993 | Wilcox |
| 5,454,675 A | 10/1995 | DeHaitre |
| 5,562,379 A * | 10/1996 | Rausch et al. ............... 411/361 |
| 6,182,345 B1 | 2/2001 | Travis |
| 6,231,286 B1 * | 5/2001 | Bogatz et al. ............. 411/371.1 |
| 6,233,802 B1 * | 5/2001 | Fulbright ................. 29/243.519 |
| 6,283,691 B1 | 9/2001 | Bogatz et al. |
| 6,389,676 B1 | 5/2002 | Denham |
| 6,497,024 B2 | 12/2002 | Fulbright |
| 6,748,642 B2 | 6/2004 | Tsegga et al. |
| 7,195,438 B2 | 3/2007 | Harbin et al. |
| 7,465,234 B2 | 12/2008 | Keener et al. |
| 7,597,517 B2 * | 10/2009 | Beeles et al. ............... 411/361 |
| 7,654,909 B2 | 2/2010 | Keener et al. |
| 8,011,076 B2 | 9/2011 | Beeles et al. |
| 2001/0029651 A1 | 10/2001 | Fulbright |
| 2002/0157226 A1* | 10/2002 | Hagedorn et al. ........ 29/243.522 |
| 2003/0115743 A1 | 6/2003 | Fulbright |
| 2003/0219327 A1* | 11/2003 | Beeles et al. ............... 411/361 |
| 2008/0184545 A1 | 8/2008 | Cobzaru et al. |
| 2009/0320259 A1 | 12/2009 | Beeles et al. |
| 2010/0257714 A1* | 10/2010 | Mercer et al. ........... 29/243.529 |
| 2013/0277960 A1* | 10/2013 | Neal et al. ....................... 285/93 |
| 2014/0029900 A1* | 1/2014 | Logan et al. .................... 385/92 |

* cited by examiner

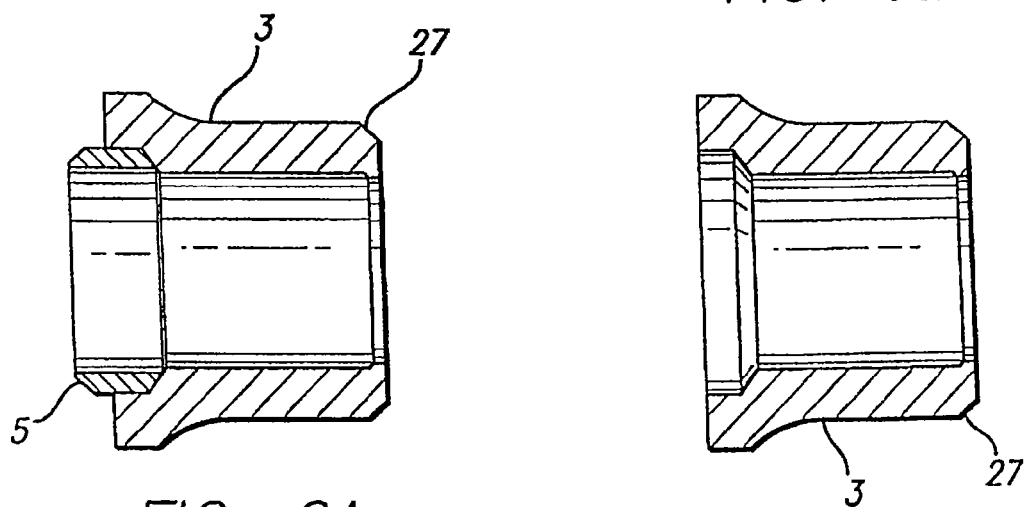
FIG. 6A
FIG. 6B
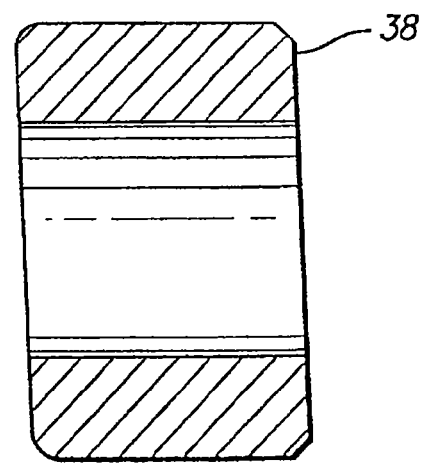
FIG. 6C

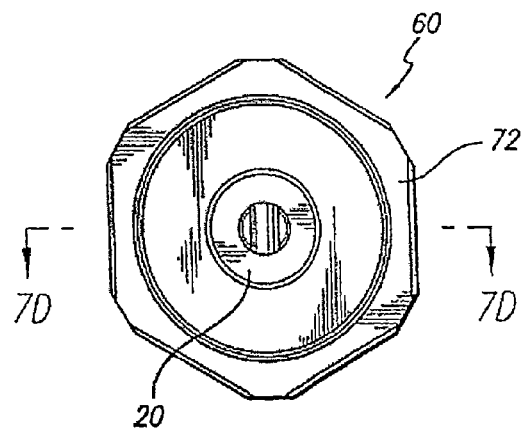
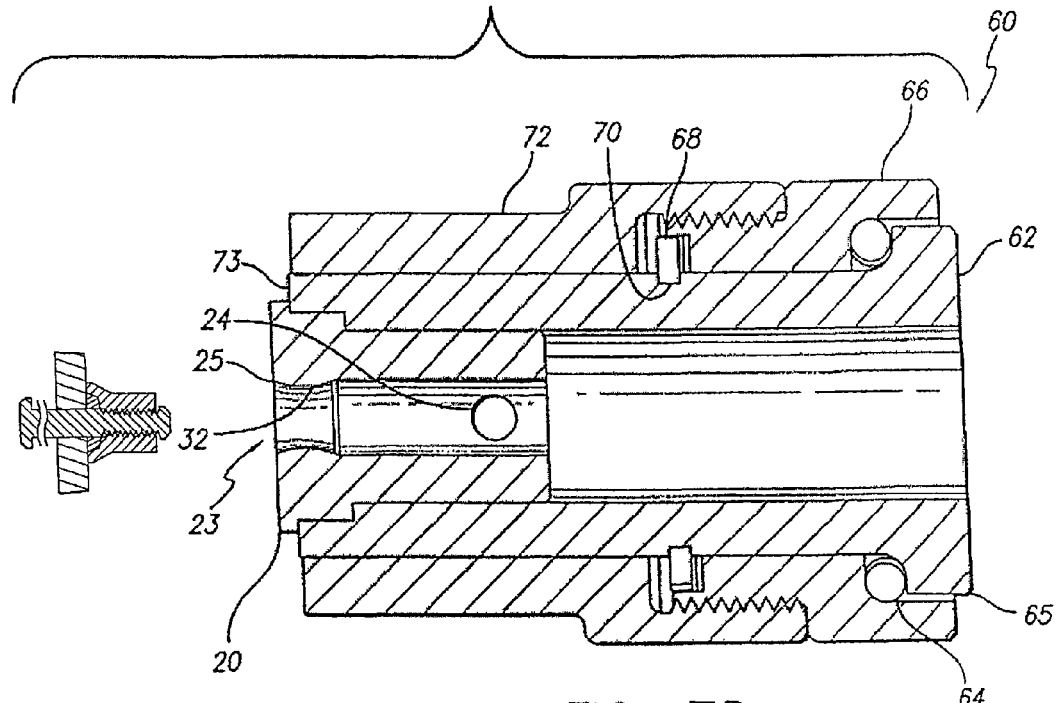

SWAGE COLLAR WITH INTERNAL SEALING INSERT

CROSS REFERENCE TO RELATED APPLICATIONS

This application is a continuation of U.S. Ser. No. 12/551,738 filed Sep. 1, 2009, now U.S. Pat. No. 8,011,076, which is a division of application Ser. No. 10/031,184, filed Jan. 16, 2002, now U.S. Pat. No. 7,597,517, which is a national stage entry of International Application No. PCT/US01/19983, filed Jun. 22, 2001, which is based upon provisional application Ser. No. 60/213,769 filed Jun. 23, 2000, all of the foregoing of which are incorporated herein by reference.

BACKGROUND OF THE INVENTION

This invention relates generally to structural fasteners, and more particularly relates to a structural fastener having a swage collar and an internal seal to prevent leakage through a connection fastened by the structural fastener.

Structural fasteners of the type to which this invention is directed typically include a headed pin with locking grooves, and a generally cylindrical collar for the pin. The structural fastener is typically used to secure a composite assembly of workpieces, and the pin is placed in aligned apertures through the workpieces to be secured together, and the collar is placed over the locking grooves of the pin. The collar is then radially compressed into the locking grooves to affix the collar on the pin. A tool that is commonly used to compress the collar over the locking grooves of the pin is a swaging tool which pulls the pin in one direction and forces a swage anvil over the collar in the other direction to affix the collar to the pin and forcibly clinch the workpieces together. When such structural fasteners are used in applications such as the joining of parts to liquid containing tanks such as aircraft fuel tanks, it is desirable that leakage from such tanks not be allowed to occur around or through such fasteners. The present invention meets these and other needs.

SUMMARY OF THE INVENTION

Briefly, and in general terms, the present invention provides for a structural fastener having a swage collar and an internal sealing insert to prevent leakage through a connection fastened by the structural fastener. The invention accordingly provides for a swage collar apparatus for sealing a connection of a fastener through a composite assembly of workpieces to be secured together, and for preventing leakage through the connection. The fastener typically includes a shaft having an externally threaded or grooved section. In a presently preferred embodiment, the swage collar apparatus includes a swage collar adapted to be disposed over the threaded or grooved section of the fastener, and an internal sealing insert disposed in the swage collar over the fastener.

The swage collar preferably comprises a hollow, generally cylindrical collar, having a main body portion with a main central bore, and a base portion with an internal shoulder formed in the main central bore so as to form a seal receiving guide, the internal shoulder having a diameter that is larger than the diameter of the main central bore. In a preferred aspect, the base portion is flared outward, having an external diameter larger than the main central bore. The swage collar is preferably formed of a deformable material, which may be a deformable metal such as aluminum or titanium, for example. In a presently preferred embodiment, the internal sealing insert is made of tetrafluoroethylene.

In one presently preferred embodiment, the shaft includes an unthreaded section, and the internal sealing insert interfaces with the threaded section and the unthreaded section of the shaft of the pin. In an alternate embodiment, the internal sealing insert interfaces with the unthreaded section of shaft of the pin.

In another aspect, the invention also provides for a method of installing a sealing fastener, in which the swage collar and sealing insert form a swage collar assembly that is fitted over the fastener, and a swaging tool is fitted over the swage collar assembly. The swaging tool has a collar entrance aperture at one end with an inside diameter at an inside edge that is slightly larger than the outside diameter of the swaging collar at the outside edge of the swaging collar, so as to fit over the swaging collar. The swaging tool is forced over the swage collar assembly with sufficient force to cause plastic deformation in the swaging collar so that the material of the swaging collar is forced into engagement with the shaft of the fastener, and to bring the internal sealing element into sealing engagement with the shaft of the fastener to form a fluid impermeable seal to prevent leakage through a connection formed by the fastener through the composite assembly of workpieces.

In another aspect, the invention provides for a swage fastening system, including a pin having an enlarged head, a smooth neck, and a threaded body, a generally cylindrical collar, and a sealing ring. The collar preferably has a main central bore, and a base portion with an internal shoulder formed in the main central bore so as to form a seal receiving guide. The internal shoulder has a diameter that is larger than the diameter of the threaded body, and the sealing ring is disposed within the internal shoulder and adapted to receive the pin. A swage tool is also provided which mechanically forces the collar over the pin affixing a workpiece between the enlarged head and the collar with the sealing ring deforming and forming a fluid impermeable seal.

These and other aspects and advantages of the invention will become apparent from the following detailed description and the accompanying drawings, which illustrate by way of example the features of the invention.

BRIEF DESCRIPTION OF THE DRAWINGS

FIG. 6A is a sectional view of a swaging collar and a sealing insert assembly showing the dimensions of the sealing insert in relation to the collar;

FIG. 6B is a sectional view of a swaging collar showing the dimensions of the collar;

FIG. 6C is a sectional view of an alternate embodiment of a blank for the formation of the swaging collar;

FIG. 7C is an end view of the assembled swaging tool of FIG. 7B;

FIG. 7D is a sectional view of the swaging tool assembly taken along line 7D-7D of FIG. 7C;

the sealing insert interfaces with a relatively flat, unthreaded, ungrooved section 12 of the pin. FIG. 2 depicts an assembly in which the relative dimensions of the pin 7, its threads or grooves 10, the swaging collar 3, and the internal sealing insert 5 are such that the sealing insert interfaces with a threaded or grooved section 15 of the pin. Although either configuration may provide a useful fastener, the configuration of FIG. 2 provides greater grip and more secure sealing and is therefore regarded as preferable.

FIG. 3 depicts a swaging collar 3 and a sealing insert 5 in an uninstalled and unswaged condition apart from the pin (not shown). The collar is made of a suitable metal or another deformable material. Applicants have used aluminum (2024 Aluminum per QQ-A-430 or AMS-QQ-225/6), with heat treatment to a T4 or T42 condition per AMS2770 or AMS-H-6088), and commercially pure titanium (CP Titanium per ASTM B348 Grade 1, MIL-T-9047 CP-4). Applicants have used tetrafluoroethylene (TFE), such as TFE available under the brand name "TEFLON" from DuPont, per ASTM D1710 Type I, Grade 1 for the sealing insert. Other materials may be specified for either the collar 3 or the sealing insert 5 based on desired material properties well known to those skilled in the art. Exemplary dimensions for the swaging collar and sealing insert as depicted in FIG. 3 are presented in Table 1 below. In the tables below, "Dash No." indicates the nominal diameter of a mating pin in $\frac{1}{32}$nds of an inch. The dimensions apply after the swaging collar and sealing insert are finished, and in FIG. 3, the diameter "C" is the inner diameter of the sealing insert.

TABLE 1

Dimensions of the swaging collar and sealing insert

| Dash No. | Pin Nom. Dia. | A Dia. | B Dia. | C Dia. Min. | E Dia. Min. | F Dia. | J RAD REF. | L | M Max. | N REF. | P Max |
|---|---|---|---|---|---|---|---|---|---|---|---|
| 6 | 3/16 | .384 .364 | .193 .189 | .188 | .185 | .298 .294 | .150 | .284 .264 | .055 | .060 | .016 |
| 8 | 1/4 | .477 .457 | .253 .249 | .248 | .245 | .391 .387 | .150 | .349 .329 | .070 | .060 | .016 |
| 10 | 5/16 | .581 .561 | .316 .312 | .310 | .310 | .484 .480 | TBD | .448 .428 | TBD | .060 | .031 |
| 12 | 3/8 | .712 .692 | .378 .374 | .372 | .372 | .588 .584 | TBD | .493 .473 | TBD | .060 | .031 |

DETAILED DESCRIPTION OF THE PREFERRED EMBODIMENTS

Figure 1:
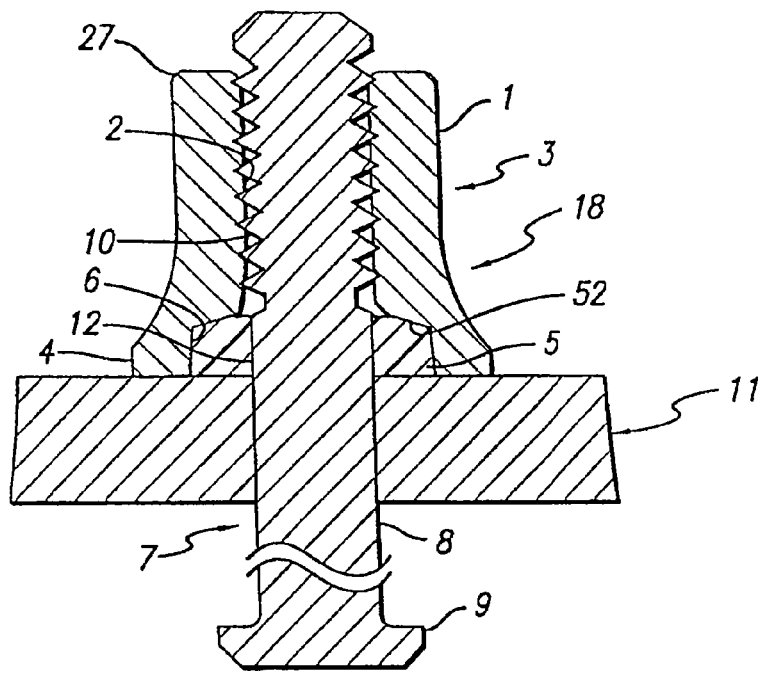
FIG. 1 is a sectional view of an assembly according to a first preferred embodiment, showing a portion of a pin with the swaging collar and internal sealing insert, according to the present invention.
Figure 2:
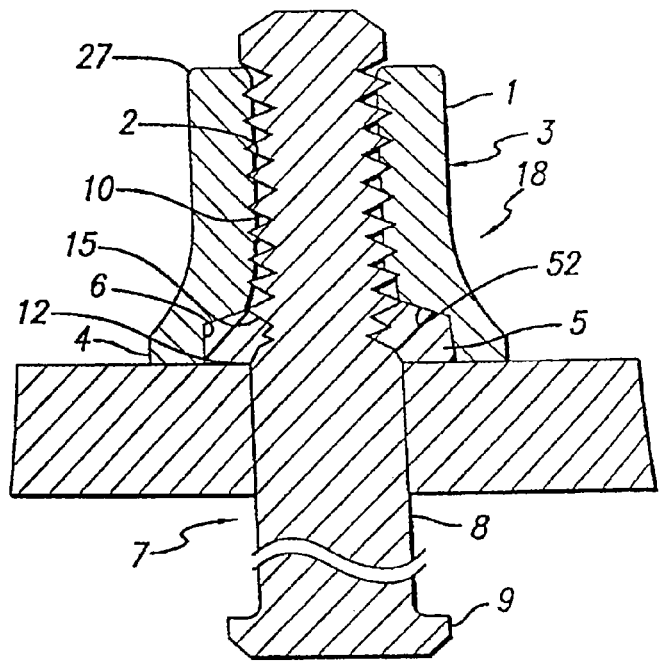
FIG. 2 is a sectional view of an assembly according to a second preferred embodiment, showing a portion of a pin with the swaging collar and internal sealing insert, according to the present invention.

The invention is depicted in cross-section in FIGS. 1 and 2. A preferred embodiment of the invention includes a hollow, generally cylindrical swage or swaging collar 3 with an internal sealing insert 5. The swaging collar includes a main body portion 1 with a main central bore 2, and a base portion 4 with an internal shoulder 6 formed in the main central bore so as to form a seal receiving guide. The internal shoulder has a diameter that is larger than the diameter of the main central bore. The base portion is preferably flared outward, and has an external diameter larger than the main body portion. The swage collar and seal are intended for use with an externally threaded fastener such as a pin 7 having a shaft 8 and an enlarged head 9, the pin being of the type used in fastening together components 11 in aerospace and other applications.

Figure 3:
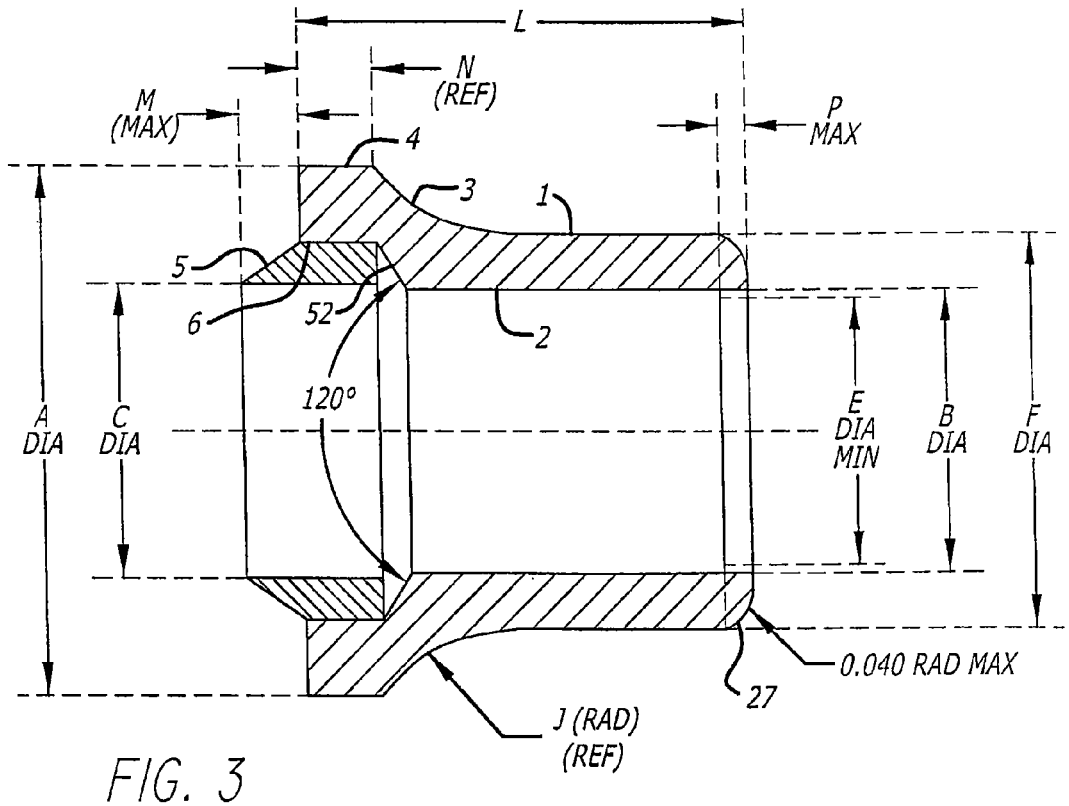
FIG. 3 is a sectional view of a swaging collar and a sealing insert in an uninstalled and unswaged condition apart from the pin, according to the present invention.

FIG. 1 depicts an assembly in which the relative dimensions of the pin 7, its threads or grooves 10, the swage or swaging collar 3, and the internal sealing insert 5 are such that The collar assembly 18, comprising the swaging collar 3 and the sealing insert 5 illustrated in FIG. 3, is installed using a swaging tool 20 depicted in FIGS. 4A-4E. Note that the dimensions given for the swaging tool depicted in FIG. 4A-4E are not consistent with use with the collar assembly 18 depicted in FIG. 3. As noted above, the collar assembly may have a wide range of dimensions. Each collar assembly will be installed with an appropriately sized matching swaging tool.

Figure 4A:
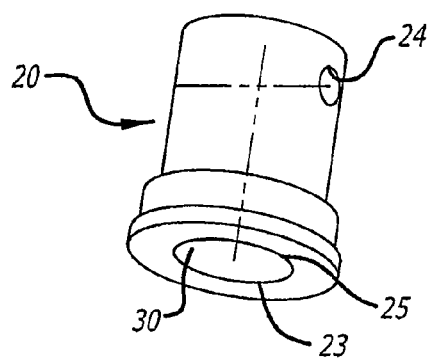
FIG. 4A is a perspective view of a swaging tool according to the present invention.
Figure 4B:
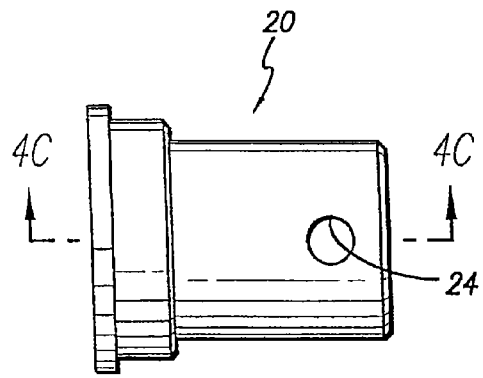
FIG. 4B is a plan view of the swaging tool of FIG. 4A.
Figure 4D:
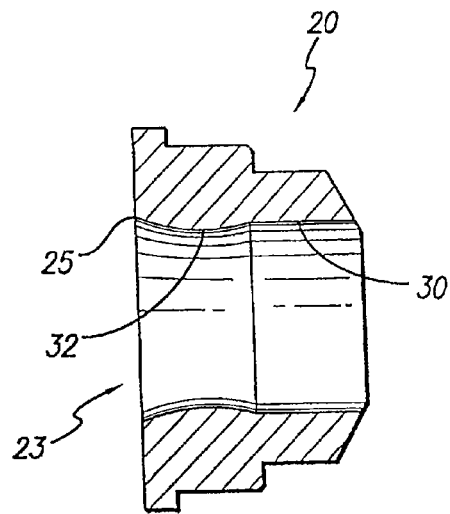
FIG. 4D is a sectional view of an alternate embodiment of a swaging tool according to the present invention.
Figure 4C:
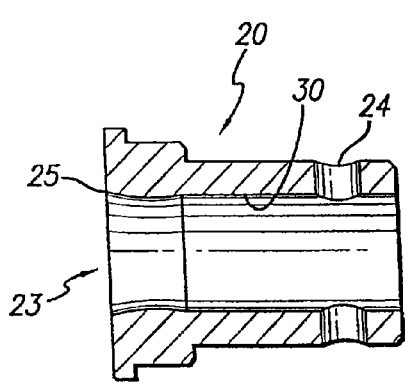
FIG. 4C is a sectional view of the swaging tool taken along line 4C-4C of FIG. 4B.
Figure 4E:
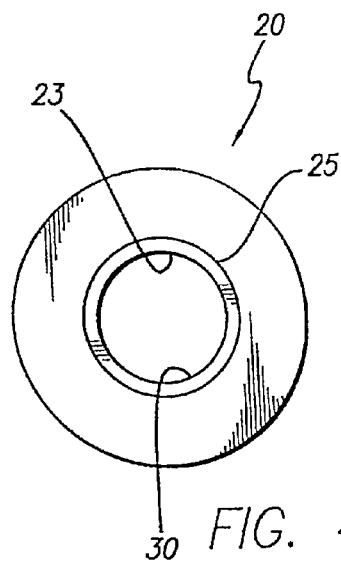
FIG. 4E is an end view of the swaging tool of FIGS. 4A and 4D.
Figure 7A:
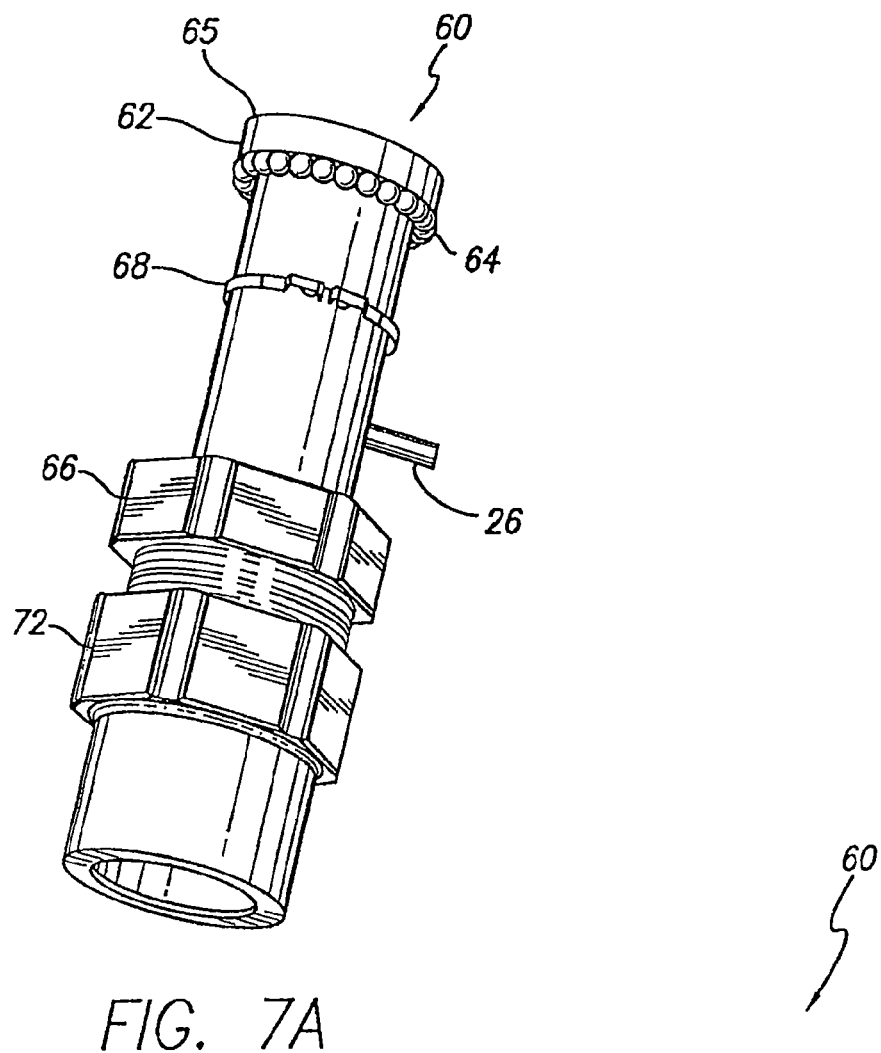
FIG. 7A is a partially exploded perspective view of a swaging tool assembly.
Figure 7B:
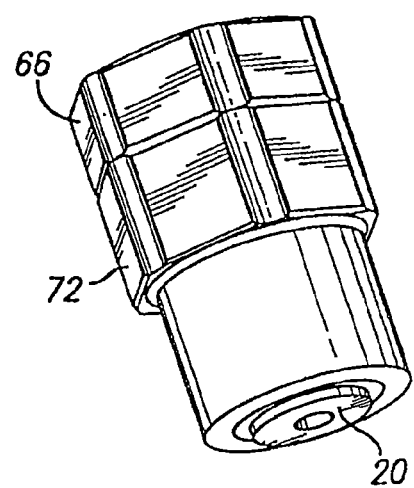
FIG. 7B is a perspective view of the assembled swaging tool of FIG. 7A.

Referring now especially to the cross-sectional detail view of FIG. 4C, the swaging tool 20 defines a collar entrance aperture 23 at one end. A transverse aperture 24 is provided through the body of the swaging tool for a dowel pin 26 shown in FIG. 7A. The tool is sized so that the entrance aperture has an inside diameter at its edge 25 that is slightly larger than the outside diameter of the swaging collar at the swaging collar's outside edge 27 (see, e.g. FIG. 3). The swaging tool may thus be fit over the swaging collar. The interior 30 of the swaging tool necks down smoothly to a relatively narrow point 32 on the swaging tool where the inside diameter is slightly smaller than the outside.

To swage the collar assembly 18 onto a threaded pin 7, the collar assembly is first fitted over the pin. The relative clearances between the pin and the sealing element and swaging collar are such that this may be done by an assembler by hand. The swaging tool 20 is then fit over the swaging collar and forced over the collar by a pneumatic impact tool or another appropriate means. Sufficient force is applied to the swaging collar to cause plastic deformation in the swaging collar so that the material of the swaging collar is force into the threads, thereby bringing the sealing element into tight sealing engagement with the pin as shown, e.g., in FIGS. 1 and 2.

A swaging collar assembly incorporating the invention has been found to be particularly useful in applications such as the joining of parts to aircraft fuel tanks. The combination of the threaded pin and metal swaging collar provide an inexpensive, easily installed, and secure fastener for joining the parts together, while the presence of the sealing element and its engagement with the pin prevent leakage of fuel or other fluids from the tank.

Figure 5A:
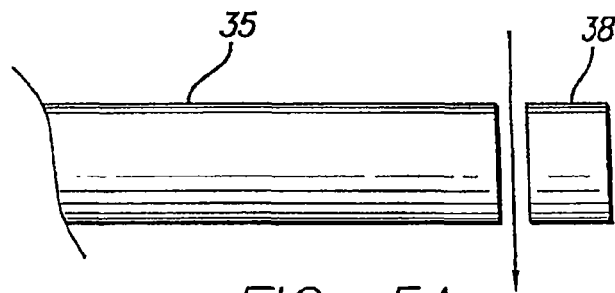
FIG. 5A is a schematic diagram showing the slicing off of a portion of a metal wire or bar stock to form a blank for the formation of the swaging collar, according to the present invention.

The swaging collar may be formed by conventional machining technique such as turning on a lathe. It has been found more economical, though, to form the swaging collar 3 by a technique illustrated in FIGS. 5A-5C. As indicated in FIG. 5A, the process begins with a length of metal wire or bar stock 35. A forming blank 38, having a volume equal to the final volume of the swaging collar, is sliced off the end of the stock.

Figure 5B:
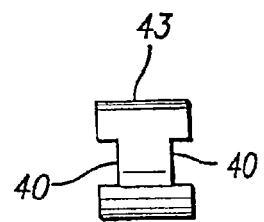
FIG. 5B is a schematic diagram illustrating the punching of the blank of FIG. 5A for form indentations in the blank.
Figure 5C:
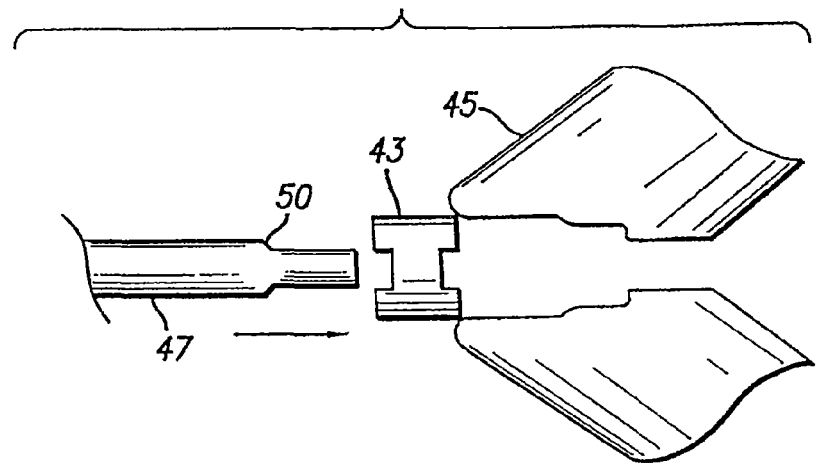
FIG. 5C is a schematic diagram illustrating the forcing of the punched blank into a die by another punch to form the swaging collar according to the present invention.

Moving now to FIG. 5B, the forming blank 38 is punched at both ends to form twin indentations 40 in the cylindrical blank. Finally, as indicated in FIG. 5C, the punched blank 43 is forced into a die 45 by another punch 47. The punch goes entirely through the blank, forming an opening through it while forcing it against the sides of the die. A step 50 on the punch forms a well 52 (see FIG. 3), into which the sealing insert 5 is set before the collar assembly 18 is swaged onto the pin.

FIGS. 6A-B show views and dimensions of a collar and insert assembly with exemplary dimensions presented in Table 2 below. FIG. 6C shows an alternate embodiment of a preform blank 43' of the collar with the blank formed with an opening entirely through the blank, for dash no. sizes 10 and 12, with exemplary dimensions presented in Table 3 below. FIGS. 7A-D show views of a swaging tool assembly 60, which includes an anvil 62, ball bearings 64 at a top end 65 of the anvil, a nut 66 over the ball bearings at the top end of the anvil, and over a snap ring 68 located in a groove 70 at a mid-portion of the anvil. A sleeve 72 is provided over and threadedly connected to the nut, extending to the bottom end 73 of the anvil.

TABLE 3

Dimensions of the preform blank

| Dash No. | BA Dia. | BH Dia. | BL | BR Rad. |
|---|---|---|---|---|
| 10 | .569 | .320 | TBD | .040 |
|  | .567 | .318 |  | .030 |
| 12 | .700 | .382 | TBD | .040 |
|  | .698 | .380 |  | .030 |

Figure 8:
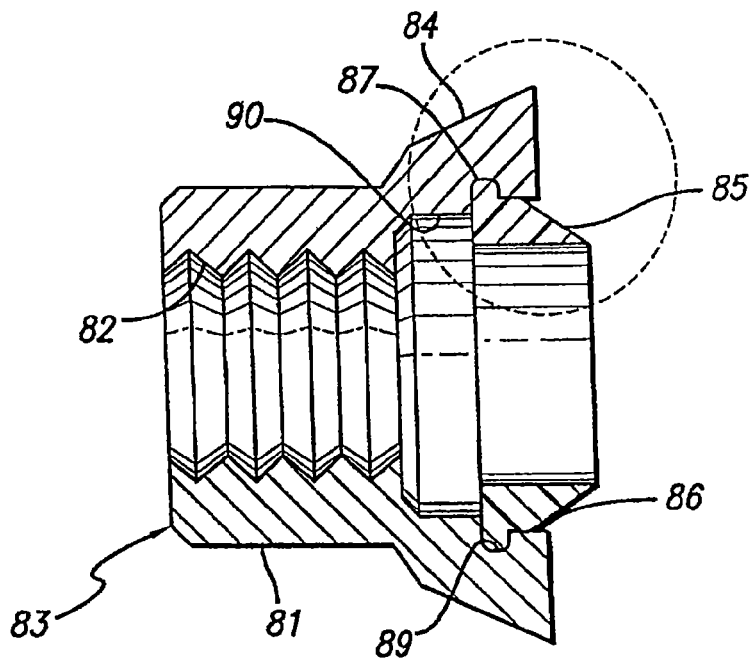
FIG. 8 is a sectional view of an alternate embodiment of a swaging collar and a sealing insert in an uninstalled and unswaged condition apart from the pin, according to the present invention.
Figure 9:
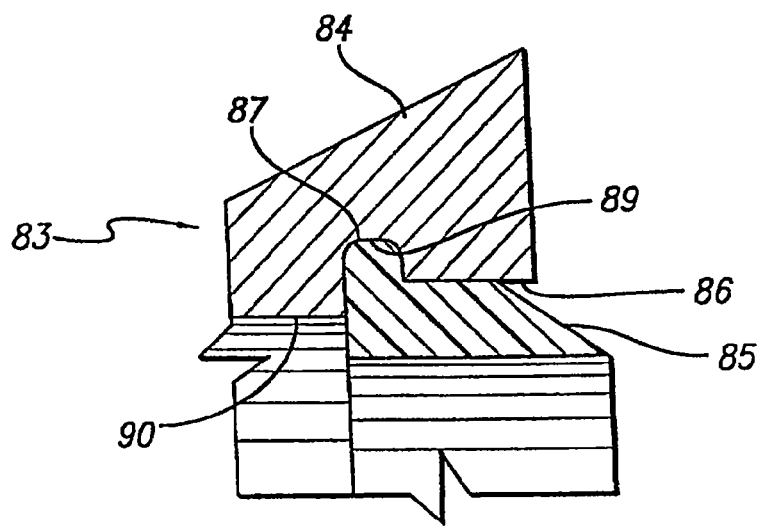
FIG. 9 is a detail view of the circled portion of FIG. 8.

FIGS. 8 and 9 depict an alternate embodiment of a swaging collar 83 and a sealing insert or sealing ring 85 in an uninstalled and unswaged condition apart from the pin (not shown). The swaging collar includes a main body portion 81 with a main central bore 82, and a base portion 84 with an internal shoulder 86 formed in the main central bore so as to form a seal receiving guide. The internal shoulder has an interior diameter that is larger than the diameter of the main central bore. The base portion is preferably flared outward, and has an external diameter larger than the main body portion. The swage collar and seal are intended for use with an externally threaded or grooved fastener such as a pin having a shaft and an enlarged head, the pin being of the type used in fastening together components in aerospace and other applications, as described above. The collar is made of a suitable metal or another deformable material, such as commercially pure titanium or aluminum, as described above. The sealing insert may also be made of tetrafluoroethylene (TFE), such as TFE available under the brand name "TEFLON" from DuPont, as described above. Other materials may be specified for either the collar 83 or the sealing insert 85 based on desired material properties well known to those skilled in the art. The sealing insert includes an annular rounded exterior flange 87, that interfits into a corresponding rounded channel or groove 89 in the internal shoulder of the main central bore, in order to lock the sealing insert into place within the internal shoulder portion of the main central bore. The internal shoulder of the main central bore may also include an intermediate stepped portion 90 with an interior diameter that is less than the interior diameter of the internal shoulder 86 and greater than the diameter of the main central bore, in order to further lock the sealing insert into place in the internal shoulder of the main central bore.

It will be apparent from the foregoing that while particular forms of the invention have been illustrated and described, various modifications can be made without departing from

TABLE 2

Dimensions of the swaging collar and sealing insert († — To be determined)

| Dash No. | A Dia. | B Dia. | E Dia. Min | F Dia. | H Dia. | J Rad. | L | N | P Max | X | AB Dia. Min. | AD |
|---|---|---|---|---|---|---|---|---|---|---|---|---|
| 5 | .346 | † | .160 | .260 | .167 | † | .266 | .065 | .016 | .060 | .164 | † |
|  | .326 |  |  | .256 | .163 |  | .246 | .055 |  | .055 |  |  |
| 6 | .384 | † | .185 | .298 | .193 | † | .284 | .065 | .016 | .060 | .188 | † |
|  | .364 |  |  | .294 | .189 |  | .264 | .055 |  | .055 |  |  |
| 8 | .477 | .325 | .245 | .391 | .253 | .160 | .349 | .060 | .016 | .060 | .248 | .055 |
|  | .457 | .323 |  | .387 | .249 | .150 | .329 | .055 |  | .055 |  | .040 |
| 10 | .581 | † | .310 | .484 | .316 | † | .448 | .060 | .031 | .060 | .310 | † |
|  | .561 |  |  | .480 | .312 |  | .428 | .055 |  | .055 |  |  |
| 12 | .712 | † | .372 | .588 | .378 | † | .493 | .060 | .031 | .060 | .372 | † |
|  | .692 |  |  | .584 | .374 |  | .473 | .055 |  | .055 |  |  |

What is claimed is:

1. A swage collar assembly comprising, in an un-swaged state, a deformable swage collar having a body portion with an outer surface, a first end portion and a second end portion, wherein the second end portion includes an end surface, wherein the swage collar includes a central bore extending through the swage collar from the first end portion to the second end portion, a counterbore having a diameter larger than a diameter of the central bore and extending from the second end portion to an intermediate portion within the swage collar, the intermediate portion including a wall extending axially and inwardly from the counterbore to the central bore and defining a cavity extending axially within the swage collar; and a sealing element having a flat base and a second end portion, and wherein the second end portion of the sealing element converges from a surface of the counterbore and extends axially beyond the end surface of the swage collar second end portion.

2. The swage collar assembly of claim 1 wherein the body portion includes an annular groove in a side wall of the counterbore and wherein the sealing element includes an annular flange extending from the base into the annular groove.

3. The swage collar assembly of claim 1 wherein the counterbore is a first counterbore, wherein the body portion further includes a second counter bore between the intermediate portion and the first counterbore having a diameter less than that of the first counterbore and greater than that of the central bore.

4. The swage collar assembly of claim 3 wherein the sealing element has an internal diameter less than that of the second counterbore.

5. The swage collar assembly of claim 1 wherein the second end portion of the sealing element begins converging at a point interior to the body portion.

6. The swage collar assembly of claim 1 wherein the second end portion of the sealing element converges substantially to a circle joining an interior wall of the sealing element.

7. The swage collar assembly of claim 1 wherein more than half of the converging portion of the second end portion of the sealing element extends beyond the end surface of the second end portion.

8. The swage collar assembly of claim 1 wherein the sealing element is formed from a deformable material.

9. The swage collar assembly of claim 8 wherein the sealing element is formed from tetrafluoroethylene.

10. A fastener assembly comprising a swage collar assembly of claim 1 and a fastener extending inside the swage collar assembly and having a shaft, wherein the shaft includes an externally grooved portion and an unthreaded portion, and wherein the
    sealing element contacts a portion of the externally grooved portion.

11. A method of forming a fastener assembly comprising:
    providing a fastener having a shaft;
    placing a swage collar assembly according to claim 1 on the fastener;
    moving the swage collar assembly axially along the shaft; and
    deforming the swage collar assembly so that material of the swage collar engages the shaft of the fastener and the internal sealing insert engages a surface on the fastener.

12. The method of claim 11 further including moving the swage collar assembly against a surface in such a way as to deform the converging portion of the internal sealing insert into the counterbore.

13. The method of claim 12 wherein deforming the converging portion of the internal sealing insert results in the end surface of the second end portion contacting the surface against which the swage collar assembly is moved.

14. The method of claim 13 wherein after deforming the swage collar assembly, at least part of the internal sealing insert extends into the cavity.

15. The swage collar assembly of claim 1 wherein the cavity wall extends at a substantially constant angle.

16. The swage collar assembly of claim 15 wherein the angle of the cavity wall forms in cross section an angle of approximately 120°.

* * * * *